United States Patent
Tsujita et al.

(10) Patent No.: US 10,322,390 B2
(45) Date of Patent: Jun. 18, 2019

(54) BIOMASS CAKE PRESSURE-FEEDING APPARATUS

(71) Applicant: KAWASAKI JUKOGYO KABUSHIKI KAISHA, Kobe-shi, Hyogo (JP)

(72) Inventors: Shoji Tsujita, Itami (JP); Noriaki Izumi, Kobe (JP); Hironori Tajiri, Kobe (JP); Hiromasa Kusuda, Kobe (JP); Takashi Nishino, Suita (JP); Ryoji Obara, Kobe (JP); Hideo Tanaka, Kobe (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 0 days.

(21) Appl. No.: 15/748,388

(22) PCT Filed: Jul. 29, 2016

(86) PCT No.: PCT/JP2016/003519
§ 371 (c)(1),
(2) Date: Jan. 29, 2018

(87) PCT Pub. No.: WO2017/017962
PCT Pub. Date: Feb. 2, 2017

(65) Prior Publication Data
US 2018/0272302 A1  Sep. 27, 2018

(30) Foreign Application Priority Data
Jul. 29, 2015  (JP) ................................ 2015-149894

(51) Int. Cl.
*B65G 33/18*  (2006.01)
*B65G 33/26*  (2006.01)
(Continued)

(52) U.S. Cl.
CPC . *B01J 3/02* (2013.01); *B01J 4/00* (2013.01); *B01J 4/007* (2013.01); *B65G 33/18* (2013.01);
(Continued)

(58) Field of Classification Search
CPC ......... B65G 65/46; B65G 33/26; F04C 15/06; F04C 2/16; F04C 13/00; B01J 3/02; B01J 4/00
(Continued)

(56) References Cited

U.S. PATENT DOCUMENTS 4,881,862 A * 11/1989 Dick ...................... B65G 53/48
                                                                    198/671
9,238,827 B2 * 1/2016 Genta ................ B01D 11/0226
(Continued)

FOREIGN PATENT DOCUMENTS

BE            634522 A    11/1963
CN         102124227 A    7/2011
(Continued)

OTHER PUBLICATIONS

Jan. 10, 2018 Office Action issued in Chinese Patent Application No. 2016106039930.
(Continued)

*Primary Examiner* — James R Bidwell
(74) *Attorney, Agent, or Firm* — Oliff PLC

(57) ABSTRACT

A biomass cake pressure-feeding apparatus includes: a screw pump including a first screw with a helical first conveying thread, a second screw with a helical second conveying thread, and a casing accommodating the first screw and the second screw such that the first screw and the second screw are parallel to each other, the screw pump being configured to feed biomass cake to a high pressure reactor, the biomass cake being obtained by adding water to powdery biomass; and a throttle part positioned downstream (Continued)

of the screw pump and configured to form a material seal made of the biomass cake by restricting a flow of the biomass cake.

8 Claims, 3 Drawing Sheets

(51) Int. Cl.
*B65G 65/46* (2006.01)
*F04C 15/06* (2006.01)
*F04C 2/16* (2006.01)
*B01J 3/02* (2006.01)
*B01J 4/00* (2006.01)
*F04C 13/00* (2006.01)

(52) U.S. Cl.
CPC ........... *B65G 33/265* (2013.01); *B65G 65/46* (2013.01); *F04C 2/16* (2013.01); *F04C 13/00* (2013.01); *F04C 15/06* (2013.01); *B65G 33/26* (2013.01); *B65G 2812/0533* (2013.01)

(58) Field of Classification Search
USPC ........................................ 198/663, 671, 672
See application file for complete search history.

(56) References Cited

U.S. PATENT DOCUMENTS

2006/0080663 A1  4/2006  Pospiech
2006/0280663 A1  12/2006 Osato et al.

FOREIGN PATENT DOCUMENTS

| CN | 205876707 U | 1/2017 |
| JP | H05-56752 A | 3/1993 |
| JP | H07-504372 A | 5/1995 |
| JP | 2003-214357 A | 7/2003 |
| JP | 2008-126106 A | 6/2008 |
| JP | 2008-182925 A | 8/2008 |
| JP | 2010-521544 A | 6/2010 |
| WO | 2004/105927 A2 | 12/2004 |

OTHER PUBLICATIONS

Oct. 25, 2016 Search Report issued in International Application No. PCT/JP2016/003519.
Feb. 4, 2019 Search Report issued in European Patent Application No. 16830067.1.

\* cited by examiner

BIOMASS CAKE PRESSURE-FEEDING APPARATUS

TECHNICAL FIELD

The present invention relates to a biomass cake pressure-feeding apparatus for pressure-feeding biomass cake that is obtained by adding water to powdery biomass to a high pressure reactor.

BACKGROUND ART

Bioethanol can be obtained by the following technique: hydrolyzing biomass by using high-temperature and high-pressure subcritical water or supercritical water to obtain sugars; and fermenting the sugars into ethanol. Bioethanol production equipment using this technique includes: a high pressure reactor for performing subcritical water treatment or supercritical water treatment; and a biomass cake pressure-feeding apparatus for pressure-feeding biomass cake to the high pressure reactor (see, for example, Patent Literature 1 indicated below).

The biomass cake is pressure-fed to the high pressure reactor by the biomass cake pressure-feeding apparatus. If the water content in the biomass cake is 90 wt % or higher, the biomass cake can be handled as a continuous body, i.e., same as a liquid. Therefore, in this case, it is relatively easy to pressure-feed the biomass cake to the high pressure reactor. However, when the water content in the biomass cake is high, the ethanol concentration in the produced aqueous bioethanol solution is low, and for this reason, for example, energy for concentrating the aqueous bioethanol solution is required. Thus, an economical problem arises when the water content in the biomass cake is high. Therefore, desirably, the water content in the biomass cake is about 70 wt %. The biomass cake having such a relatively low water content of about 70 wt % is a substance having intermediate properties between solid and liquid, and since the properties of the substance are different from those of a continuous body such as a liquid, the substance cannot be handled as a continuous fluid. Therefore, it is not easy to pressure-feed the biomass cake having a low water content to the high pressure reactor.

For example, it is conceivable to use a single screw pump including a tapered screw and a tapered casing as a biomass cake pressure-feeding apparatus. The single screw pump has a passage that gradually narrows down. Therefore, while the single screw pump is conveying an object, the single screw pump can pressurize the object. However, if biomass cake having a low water content is pressurized by the single screw pump, solid-liquid separation will occur, in which the biomass and water are separated from each other, and thereby the water content in the biomass cake is further lowered. Consequently, a problem arises in that the frictional resistance of the biomass cake against the screw increases, and thereby the conveyance torque increases, causing a conveyance failure, or another problem may arise in that the biomass cake rotates together with the screw, and thereby the biomass cake cannot be conveyed.

CITATION LIST

Patent Literature

PTL 1: Japanese Laid-Open Patent Application Publication No. 2008-182925

SUMMARY OF INVENTION

Technical Problem

The present invention has been made in view of the above. An object of the present invention is to provide a biomass cake pressure-feeding apparatus capable of pressure-feeding biomass cake having a low water content to a high pressure reactor.

Solution to Problem

A biomass cake pressure-feeding apparatus according to one aspect of the present invention includes: a screw pump including a first screw with a helical first conveying thread, a second screw with a helical second conveying thread, and a casing accommodating the first screw and the second screw such that the first screw and the second screw are parallel to each other, the screw pump being configured to feed biomass cake to a high pressure reactor, the biomass cake being obtained by adding water to powdery biomass; and a throttle part positioned downstream of the screw pump and configured to form a material seal made of the biomass cake by restricting a flow of the biomass cake.

In the case of adopting a single screw pump, which has only one screw, there is a risk that the biomass cake that has a low water content and that has high frictional resistance (viscosity) against the screw may rotate together with the screw. On the other hand, in the case of adopting a multiple screw pump including a plurality of screws with fully intermeshing portions as described above, the screws convey the biomass cake in such a manner that the screws mesh with each other with slight gaps formed between their protrusions and recesses. Therefore, the biomass cake will not rotate together with the screws. A part of the above screw pump up to a conveying area (i.e., up to upstream of a direction-changing area) is configured as a fixed displacement pump. This makes it possible to suppress solid-liquid separation of the biomass cake due to pressurization of the biomass cake inside the screw pump. It should be noted that since the part of the screw pump up to the conveying area functions as a fixed displacement pump, this part is unable to pressurize the biomass cake by itself. However, since the material seal is formed by the throttle part positioned downstream of the screw pump, the biomass cake is pressurized as a result of being pushed toward the material seal. Therefore, the above-described configuration makes it possible to pressure-feed the biomass cake to the high pressure reactor even if the biomass cake has a low water content, and the biomass cake will not rotate together with the screws.

The above biomass cake pressure-feeding apparatus may include: first bearings supporting the first screw at a front and a rear of the first conveying thread; and second bearings supporting the second screw at a front and a rear of the second conveying thread.

In a case where the conveying thread of each screw of the multiple screw pump has a one-end support structure, when the biomass cake that has a low water content is pressure-fed, non-supported end portions of the respective screws are displaced away from each other. If the conveying threads are displaced in such a manner, the outer peripheral surfaces of the screws come into contact with the casing. This causes increase in the driving torque, and results in a conveyance failure. Also, a phenomenon prominently occurs, in which water contained in the biomass cake flows from the higher-pressure side to the lower-pressure side, i.e., flows to the upstream side of the conveying threads, and thereby the water content in the biomass cake is lowered. When the water content in the biomass cake is lowered, the conveyance resistance increases, and there is a risk of a conveyance failure. On the other hand, in the above-described configuration, each conveying thread has a both-end support structure, and thereby displacement of the conveying thread can be suppressed. This makes it possible to avoid the contact between the casing and the outer peripheral surfaces of the screws and suppress increase in the torque. In addition, the phenomenon, in which water in the biomass cake flows to the upstream side of the conveying threads, can be suppressed.

In the above biomass cake pressure-feeding apparatus, the first screw may include a helical sealing member provided on an outer peripheral surface of the first conveying thread, and the second screw may include a helical sealing member provided on an outer peripheral surface of the second conveying thread.

The above configuration makes it possible to suppress water in the biomass cake from flowing to the upstream side of the conveying threads more effectively.

In the above biomass cake pressure-feeding apparatus, a rotational speed of each of the first screw and the second screw may be set such that a conveyance speed of the biomass cake is such a speed that an amount of water absorbable by the biomass cake in the screw pump is greater than an amount of water flowing from the throttle part to the screw pump.

Around the throttle part, water is produced due to solid-liquid separation, and the water flows reversely to the screw pump. However, according to the above-described configuration, the amount of water absorbable by the biomass cake in the screw pump is greater than the amount of water reversely flowing from the throttle part to the screw pump. Accordingly, the reversely flowing water is absorbed by the biomass cake in the screw pump and then returned to the throttle part again. This makes it possible to suppress lowering of the water content in the biomass cake in the throttle part, and suppress the occurrence of a conveyance failure due to increase in the conveyance resistance.

In the above biomass cake pressure-feeding apparatus, the screw pump may be disposed such that the first screw and the second screw extend in a horizontal direction, and a discharge opening, through which the biomass cake is discharged, may be formed in a bottom surface of the casing.

The above configuration makes it possible to smoothly discharge the biomass cake since the discharge opening is formed in the bottom surface of the casing.

In the above biomass cake pressure-feeding apparatus, the screw pump may be disposed such that the first screw and the second screw extend in a vertical direction, and a discharge opening, through which the biomass cake is discharged, may be formed in a side surface of the casing.

According to the above configuration, L-shaped piping that includes a horizontal portion extending in the horizontal direction and a vertical portion extending in the vertical direction can be attached to the outlet of the biomass cake pressure-feeding apparatus. In a case where the L-shaped piping is attached, a structure in which the opening area of the throttle part is readily adjustable by using a conical throttle member movable in the axial direction of the throttle part can be realized, and the pressure of the conveyed biomass cake when discharged from the throttle part can be adjusted.

Advantageous Effects of Invention

As described above, the above-described biomass cake pressure-feeding apparatus makes it possible to pressure-feed biomass cake having a low water content to a high pressure reactor.

DESCRIPTION OF EMBODIMENTS

Figure 1:
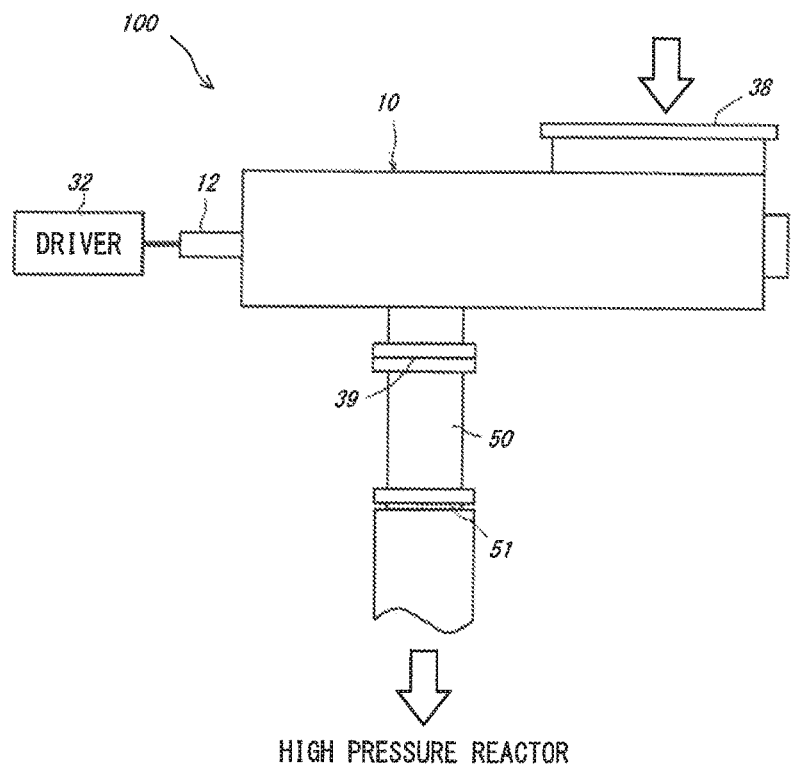
FIG. 1 shows an overall configuration of a biomass cake pressure-feeding apparatus according to Embodiment 1.

Hereinafter, embodiments of the present invention are described with reference to the drawings. In the drawings, the same or corresponding elements are denoted by the same reference signs, and repeating the same descriptions is avoided below.

Embodiment 1

First, Embodiment 1 is described. FIG. 1 shows an overall configuration of a biomass cake pressure-feeding apparatus 100 according to Embodiment 1. The biomass cake pressure-feeding apparatus 100 is an apparatus for pressurizing biomass cake that is obtained by adding water to powdery biomass and feeding the pressurized biomass cake to a high pressure reactor. As shown in FIG. 1, the biomass cake pressure-feeding apparatus 100 includes a screw pump 10 and a throttle part 50. Hereinafter, these components are described sequentially.

<Screw Pump>

Figure 2:
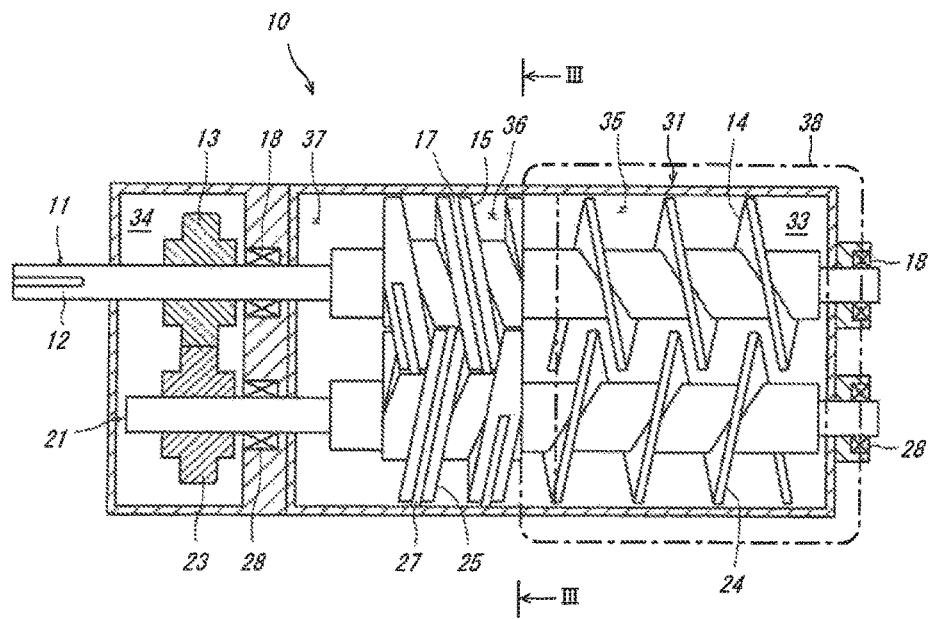
FIG. 2 is a sectional plan view of a screw pump
Figure 3:
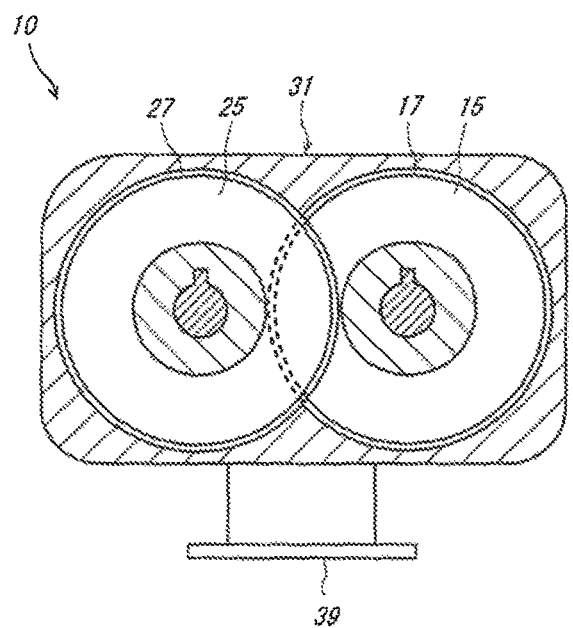
FIG. 3 is a sectional view taken along line III-III of FIG. 2.
Figure 4:
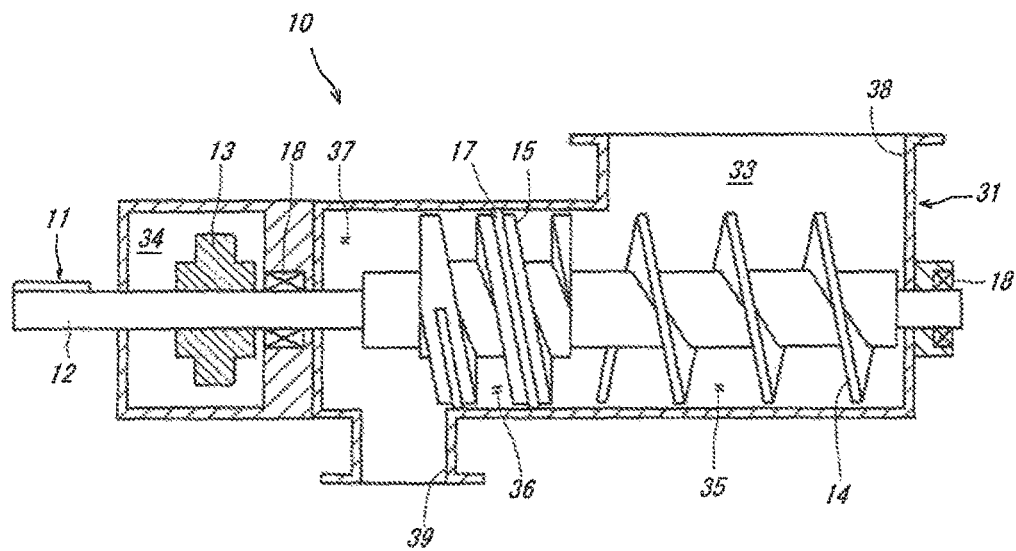
FIG. 4 is a longitudinal sectional view of the screw pump.

The screw pump 10 is a device configured to convey biomass cake. In the present embodiment, biomass cake having a relatively low water content (e.g., a water content of 70 wt %) and a high viscosity is fed to the screw pump 10. FIG. 2 is a horizontal sectional view of the screw pump 10. FIG. 3 is a sectional view as viewed in the direction of arrows of line III-III of FIG. 2. FIG. 4 is a longitudinal sectional view of the screw pump 10. It should be noted that FIG. 4 shows the first screw 11 side of the screw pump 10. As shown in FIG. 2, the screw pump 10 is a twin screw pump, and includes a first screw 11, a second screw 21, and a casing 31.

The first screw 11 is a driven screw that is driven by a driver 32 to rotate. The first screw 11 includes an inputter 12, a first timing gear 13, a first feeding thread 14, and a first conveying thread 15. The second screw 21 is a synchronizing screw that is driven by the first screw 11 to rotate in synchronization with the first screw 11. The second screw 21 includes a second timing gear 23, a second feeding thread 24, and a second conveying thread 25.

Only the first screw 11, which is a driven screw, includes the inputter 12. The second screw 21, which is a synchronizing screw, does not include the inputter 12. The inputter 12 is positioned on one end of the first screw 11 (left end in FIG. 2), and is positioned outside the casing 31. The driver 32 (FIG. 1) is coupled to the inputter 12, and transmits rotational power to the first screw 11 via the inputter 12.

The first timing gear 13 and the second timing gear 23 mesh with each other. When the first screw 11, which is a driven screw, rotates, the rotational power derived from the rotation is transmitted to the second screw 21, which is a synchronizing screw, via the first timing gear 13 and the second timing gear 23. As a result, the second screw 21 rotates in synchronization with the first screw 11.

The first feeding thread 14 is a helical thread positioned on the upstream portion of the first screw 11, and the second feeding thread 24 is a helical thread positioned on the upstream portion of the second screw 21. The first feeding thread 14 and the second feeding thread 24 rotate, thereby feeding the biomass cake charged into the screw pump 10 to the first conveying thread 15 and the second conveying thread 25. The first feeding thread 14 and the second feeding thread 24 are arranged such that these threads are partly present in each other's gaps. When the first feeding thread 14 and the second feeding thread 24 rotate, they do not come into contact with each other.

The first conveying thread 15 is a helical thread positioned downstream of the first feeding thread 14, and the second conveying thread 25 is a helical thread positioned downstream of the second feeding thread 24. A helical sealing member (gland packing) 17 is attached to the outer peripheral surface of the first conveying thread 15, and a helical sealing member (gland packing) 27 is attached to the outer peripheral surface of the second conveying thread 25. As shown in FIG. 2 and FIG. 3, the sealing member 17 attached to the first conveying thread 15 is in contact with the shaft of the second screw 21 and the casing 31. The sealing member 27 attached to the second conveying thread 25 is in contact with the shaft of the first screw 11 and the casing 31.

The first conveying thread 15 and the second conveying thread 25 rotate, thereby conveying the biomass cake in the axial direction. The thickness of the first conveying thread 15 and the second conveying thread 25 in the axial direction is greater than that of the first feeding thread 14 and the second feeding thread 24. The second conveying thread 25 is inserted in the groove of the first conveying thread 15 with a slight gap formed in between, and also, the first conveying thread 15 is inserted in the groove of the second conveying thread 25 with a slight gap formed in between. For this reason, the volume of the space formed by the first conveying thread 15, the second conveying thread 25, and the casing 31 is small. It should be noted that the thickness of the first conveying thread 15 and the second conveying thread 25 is constant, and the volume of the space formed by the first conveying thread 15, the second conveying thread 25, and the casing 31 is constant at any position in the axial direction. That is, a part of the screw pump 10 up to a conveying area 36 (described below) (i.e., up to upstream of a direction-changing area 37 (described below)) is configured as a fixed displacement pump, and this part is unable to pressurize the biomass cake by itself.

The screw pump 10 further includes: two first bearings 18 supporting the first screw 11; and two second bearings 28 supporting the second screw 21. One of the first bearings 18 is disposed on a portion of the first screw 11 outside the first feeding thread 14 in the axial direction, and the other first bearing 18 is disposed on a portion of the first screw 11 between the first conveying thread 15 and the first timing gear 13. Accordingly, looking at the first conveying thread 15, it can be considered that the first bearings 18 support the first screw 11 at the front and the rear of the first conveying thread 15. Similarly, one of the second bearings 28 is disposed on a portion of the second screw 21 outside the second feeding thread 24 in the axial direction, and the other second bearing 28 is disposed on a portion of the second screw 21 between the second conveying thread 25 and the second timing gear 23. Accordingly, looking at the second conveying thread 25, it can be considered that the second bearings 28 support the second screw 21 at the front and the rear of the second conveying thread 25.

The casing 31 is a member accommodating the first screw 11 and the second screw 21 such that the first screw 11 and the second screw 21 are parallel to each other. The casing 31 includes: a passage 33, through which the biomass cake passes; and a gear chamber 34, in which the first timing gear 13 and the second timing gear 23 are accommodated. It should be noted that it is not essential that the passage 33 and the gear chamber 34 be formed in the same casing 31, and it is also not essential that the passage 33 and the gear chamber 34 be adjacent to each other. The passage 33 includes: a feeding area 35, in which the first feeding thread 14 and the second feeding thread 24 are positioned; the conveying area 36, in which the first conveying thread 15 and the second conveying thread 25 are positioned; and the direction-changing area 37, in which the biomass cake is pressurized by changing the conveying direction of the biomass cake by 90°.

As shown in FIG. 4, a charging opening 38 for charging the biomass cake into the passage 33 is formed in the top surface of the casing 31 above the feeding area 35. Also, a discharge opening 39 for discharging the biomass cake is formed in the bottom surface of the casing 31, such that the discharge opening 39 is positioned from the downstream part of the conveying area 36 to the direction-changing area 37. Accordingly, the biomass cake charged from the charging opening 38 passes through the feeding area 35, the conveying area 36, and the direction-changing area 37, and is discharged from the discharge opening 39. In the present embodiment, since the discharge opening 39 is formed in the bottom surface of the casing 31, the biomass cake can be discharged smoothly.

The screw pump 10 is configured as described above. In the present embodiment, the biomass cake is conveyed by the screw pump 10 in the above-described manner. Since the driving torque of the screw pump 10 is relatively low, even if the water content in the biomass cake is low and the conveyance resistance of the biomass cake is high, the biomass cake can be conveyed smoothly. It should be noted that, as previously described, the volume of the space formed by the first conveying thread 15, the second conveying thread 25, and the casing 31 is constant at any position in the axial direction. For this reason, the biomass cake cannot be pressurized in the conveying area 36. However, as previously described, the biomass cake can be pressurized in the direction-changing area 37, and also, by pushing the biomass cake from the direction-changing area 37 toward the throttle part 50, which will be described below, the biomass cake can be pressurized also in the throttle part 50.

When solid-liquid separation occurs due to the pressurization of the biomass cake, water in the biomass cake may flow (reversely) from the conveying area 36 toward the feeding area 35, i.e., in a direction opposite to the conveying direction. If such a phenomenon occurs, the water content in the biomass cake is lowered, causing the conveyance resistance to increase and causing the conveyance torque to become excessively high, which may result in a situation where the biomass cake cannot be conveyed.

In this respect, since each of the first conveying thread 15 and the second conveying thread 25 of the present embodiment has a both-end support structure, displacement of the first conveying thread 15 and the second conveying thread 25 away from each other can be suppressed. This makes it possible to prevent increase in the following gaps: the gap between the first conveying thread 15 and the casing 31; the gap between the first conveying thread 15 and the shaft of the second screw 21; the gap between the second conveying thread 25 and the casing 31; and the gap between the second conveying thread 25 and the shaft of the first screw 11. Consequently, water in the biomass cake can be suppressed from reversely flowing from the conveying area 36 to the feeding area 35. In addition, since the sealing members 17 and 27 are provided on the outer peripheral surfaces of the first and second conveying threads 15 and 25, respectively, water in the biomass cake can be suppressed from reversely flowing from the conveying area 36 to the feeding area 35 more effectively.

Assume that a single screw pump, which has only one screw, is adopted. In this case, since the conveyance resistance of the biomass cake that has a low water content is high, as the compression of the biomass cake progresses, the friction force (adhesion force) of the biomass against the screw increases. Consequently, there is a risk that the biomass cake and the screw may rotate together. In this respect, the screw pump 10 of the present embodiment is a twin screw pump, and the first screw 11 and the second screw 21 convey the biomass cake in such a manner that these screws mesh with each other with slight gaps formed between their protrusions and recesses. Therefore, the biomass cake will not rotate together with the screws.

It should be noted that the first screw 11 of the present embodiment is formed by fixing the following members to a shaft member that extends over the total length of the first screw 11: a member that is formed by integrating the first feeding thread 14 with a cylindrical portion positioned at the root of the thread 14; and a member that is formed by integrating the first conveying thread 15 with a cylindrical portion positioned at the root of the thread 15. However, as an alternative, the first screw 11 may have a structure that does not include the above shaft member. For example, the first screw 11 may be formed by coupling the above members together in the axial direction without the shaft member. The same is true of the second screw 21.

<Throttle Part>

Figure 5:
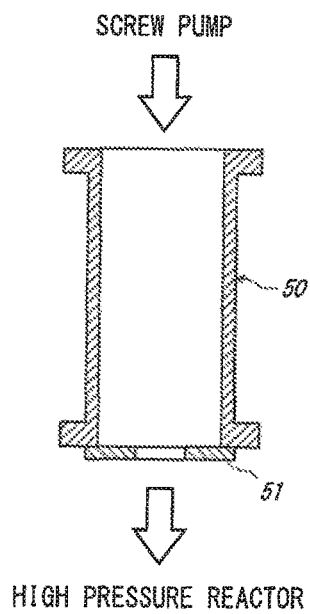
FIG. 5 is a longitudinal sectional view of a throttle part.

Next, the throttle part 50 is described. The throttle part 50 is intended for forming a material seal made of the biomass cake by restricting the flow of the biomass cake. As shown in FIG. 1, the throttle part 50 is positioned downstream of the screw pump 10. That is, the throttle part 50 is positioned between the screw pump 10 and the high pressure reactor. FIG. 5 is a longitudinal sectional view of the throttle part 50. As shown in FIG. 5, overall, the throttle part 50 has a cylindrical shape whose central axis extends in the vertical direction. The throttle part 50 includes an annular throttle member 51 provided on its downstream portion. The throttle member 51 is formed such that the passage area thereof is smaller than the passage area of the remaining portion of the throttle part 50. It should be noted that the throttle member 51 may be configured such that the passage area thereof is variable.

Since the throttle part 50 is configured in the above-described manner, the flow of the biomass cake is restricted by the throttle member 51. Accordingly, the biomass cake is gradually accumulated at the upstream side of the throttle member 51, and thereby a material seal made of the biomass cake is formed. The material seal allows the flow of the biomass cake from the screw pump 10 toward the high pressure reactor, and meanwhile, serves as a non-return valve restricting the flow of the biomass cake from the high pressure reactor toward the screw pump 10.

It should be noted that immediately after the biomass cake pressure-feeding apparatus 100 starts operating, the biomass cake is not yet sufficiently accumulated in the throttle part 50, and it is likely that the material seal is not formed yet. Therefore, for example, at the time of starting the biomass cake pressure-feeding apparatus 100, a plate member (not shown) having a large number of through-holes may be attached to the opening of the throttle member 51. This facilitates the accumulation of the biomass cake at the upstream side of the throttle member 51. After the material seal is formed, the plate member may be removed. It should be noted that if the throttle member 51 is configured such that the passage area thereof is variable, then the attachment and removable of the plate member are unnecessary.

As previously mentioned, the pressure in the high pressure reactor positioned downstream of the biomass cake pressure-feeding apparatus 100 is very high. For this reason, the sealing function of the screw pump 10 alone may be insufficient for suppressing a pressure drop in the high pressure reactor. In this respect, in the present embodiment, the material seal made of the biomass cake is formed by the throttle part 50, and the flow of the biomass cake from the high pressure reactor toward the screw pump 10 can be restricted by the material seal. This makes it possible to suppress a pressure drop in the high pressure reactor.

In the throttle part 50, water is temporarily separated from the biomass cake, and the separated water flows reversely from the throttle part 50 toward the screw pump 10. However, the higher the conveyance speed of the biomass cake, the more the biomass cake passes through the screw pump 10. Therefore, if the conveyance speed of the biomass cake is a certain speed or higher, all of the reversely flowing water will be collected by the biomass cake in the screw pump 10 and then returned to the throttle part 50. Consequently, the water content in the biomass cake passing through the throttle part 50 is kept constant. On the other hand, if the conveyance speed of the biomass cake is lower than the certain speed, the reversely flowing water cannot be entirely collected by the biomass cake in the screw pump 10, and only a part of the separated water will be returned to the throttle part 50. For this reason, the water content in the biomass cake passing through the throttle part 50 is gradually lowered in accordance with lowering of the conveyance speed of the biomass cake, and the state of the biomass cake becomes close to solid, which causes increase in the conveyance resistance of the biomass cake. Consequently, there is a risk that a conveyance failure of the biomass cake occurs and the biomass cake is not compressed sufficiently, resulting in a situation where the biomass cake in the throttle part 50 does not function as a material seal.

In view of this, in the present embodiment, the rotational speed of each of the first screw 11 and the second screw 21 is set such that the conveyance speed of the biomass cake is such a speed that the amount of water absorbable by the biomass cake in the screw pump 10 is greater than the amount of water reversely flowing from the throttle part 50 to the screw pump 10. That is, in a case where the amount of water reversely flowing from the throttle part 50 to the screw pump 10 is greater than the amount of water absorbable by the biomass cake in the screw pump 10, the rotational speed of each of the first screw 11 and the second screw 21 is increased. In this manner, the water content in the biomass cake in the throttle part 50 is kept constant, and increase in the conveyance resistance of the biomass cake is suppressed. This consequently makes it possible to suppress release of the internal pressure of the high pressure reactor into the screw pump 10 through gaps formed in the biomass cake.

Embodiment 2

Figure 6:
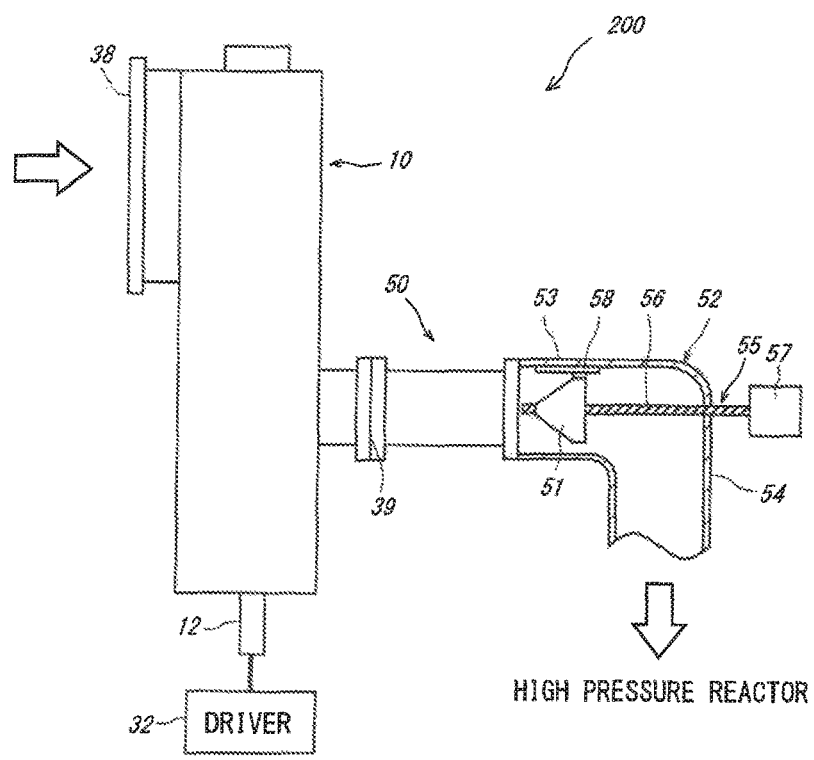
FIG. 6 shows an overall configuration of a biomass cake pressure-feeding apparatus according to Embodiment 2.

Next, Embodiment 2 is described. FIG. 6 shows an overall configuration of a biomass cake pressure-feeding apparatus 200 according to Embodiment 2. Hereinafter, the biomass cake pressure-feeding apparatus 200 according to Embodiment 2 is described focusing on configurational differences from the biomass cake pressure-feeding apparatus 100 according to Embodiment 1.

The fundamental structure of the screw pump 10 of the present embodiment is the same as that of the screw pump 10 of Embodiment 1. However, in the present embodiment, the screw pump 10 is disposed vertically whereas the screw pump 10 of Embodiment 1 is disposed horizontally. That is, the screw pump 10 is disposed such that the first screw 11 and the second screw 21 extend in the vertical direction. In accordance therewith, the discharge opening 39, through which the biomass cake is discharged, is formed in the side surface of the casing 31.

In the present embodiment, since the screw pump 10 is disposed vertically, L-shaped piping 52 is used as a part of piping that connects between the biomass cake pressure-feeding apparatus 200 and a high pressure reactor positioned therebelow. Specifically, the L-shaped piping 52, which includes a horizontal portion 53 extending in the horizontal direction and a vertical portion 54 extending in the vertical direction, is attached to the outlet of the biomass cake pressure-feeding apparatus 200 (i.e., the outlet of the throttle part 50).

The throttle part 50 of the present embodiment is disposed such that the central axis thereof extends horizontally. The throttle member 51 has a conical shape, and is movable in the horizontal direction by a position adjuster 55. The position adjuster 55 is a ball screw actuator, and includes: a threaded shaft 56 extending through the inside of the horizontal portion 53 of the L-shaped piping 52 to the outside of the L-shaped piping 52; and a motor 57 positioned outside the L-shaped piping 52 and configured to rotate the threaded shaft 56. A female screw is formed in the throttle member 51, and the threaded shaft 56 is inserted in the throttle member 51 to be in mesh with the female screw. Moreover, the throttle member 51 is slidably attached to a guide rail 58 extending in the horizontal direction.

Since the throttle part 50 of the present embodiment is configured as described above, by rotating the threaded shaft 56 by the motor 57, the conical throttle member 51 is moved in the horizontal direction along the guide rail 58, and thereby the opening area at the downstream portion of the throttle part 50 can be readily adjusted. This makes it possible to make the opening area of the throttle part 50 small at the time of starting the biomass cake pressure-feeding apparatus 200, thereby readily assisting the formation of the material seal.

It should be noted that, in the present embodiment, the L-shaped piping 52 is used as the piping between the biomass cake pressure-feeding apparatus 200 and the high pressure reactor. This makes it possible to install the motor 57, which is intended for adjusting the position of the throttle member 51, outside the piping. That is, in the present embodiment, by disposing the screw pump 10 vertically, the L-shaped piping 52 can be used, and consequently, the throttle part 50 can be configured such that the opening area thereof is readily adjustable.

The embodiments of the present invention have been described above. Although the screw pump 10 in the above-described embodiments is a twin screw pump, the screw pump 10 may alternatively be a triple screw pump. In the above-described embodiments, each of the first screw 11 and the second screw 21 is supported by two bearings. Alternatively, each of the first screw 11 and the second screw 21 may be supported by three or more bearings.

REFERENCE SIGNS LIST 10 screw pump
11 first screw
15 first conveying thread
17 sealing member
18 first bearing
21 second screw
25 second conveying thread
27 sealing member
28 second bearing
31 casing
39 discharge opening
50 throttle part
51 throttle member
52 L-shaped piping
53 horizontal portion
54 vertical portion
100, 200 biomass cake pressure-feeding apparatus

The invention claimed is:

1. A biomass cake pressure-feeding apparatus, comprising:
a screw pump including a first screw with a helical first conveying thread, a second screw with a helical second conveying thread, and a casing accommodating the first screw and the second screw such that the first screw and the second screw are parallel to each other, the screw pump being configured to feed biomass cake to a high pressure reactor, the biomass cake being obtained by adding water to powdery biomass; and
a throttle part positioned downstream of the screw pump and configured to form a material seal made of the biomass cake by restricting a flow of the biomass cake, wherein the casing includes a direction-changing area, in which the biomass cake is pressurized by changing a conveying direction of the biomass cake.

2. The biomass cake pressure-feeding apparatus according to claim 1, comprising:
first bearings supporting the first screw at a front and a rear of the first conveying thread; and
second bearings supporting the second screw at a front and a rear of the second conveying thread.

3. The biomass cake pressure-feeding apparatus according to claim 1, wherein
the first screw includes a helical sealing member provided on an outer peripheral surface of the first conveying thread, and
the second screw includes a helical sealing member provided on an outer peripheral surface of the second conveying thread.

4. The biomass cake pressure-feeding apparatus according to claim 1, wherein
a rotational speed of each of the first screw and the second screw is set such that a conveyance speed of the biomass cake is such a speed that an amount of water absorbable by the biomass cake in the screw pump is greater than an amount of water reversely flowing from the throttle part to the screw pump.

5. The biomass cake pressure-feeding apparatus according to claim 1, wherein
the screw pump is disposed such that the first screw and the second screw extend in a horizontal direction, and
a discharge opening, through which the biomass cake is discharged, is formed in a bottom surface of the casing.

6. The biomass cake pressure-feeding apparatus according to claim 1, wherein
the screw pump is disposed such that the first screw and the second screw extend in a vertical direction, and
a discharge opening, through which the biomass cake is discharged, is formed in a side surface of the casing.

7. The biomass cake pressure-feeding apparatus according to claim 1, wherein
the conveying direction of the biomass cake changes by 90 degrees in the direction-changing area.

8. The biomass cake pressure-feeding apparatus according to claim 1, wherein
the biomass cake is conveyed in a first direction in the casing and in a second direction in the throttle part, the first direction being orthogonal to the second direction, and
the conveying direction of the biomass cake changes from the first direction to the second direction in the direction-changing area.

* * * * *